US012636880B2

(12) United States Patent
Shibuya

(10) Patent No.: US 12,636,880 B2
(45) Date of Patent: May 26, 2026

(54) APPARATUS AND METHOD

(71) Applicant: CANON KABUSHIKI KAISHA, Tokyo (JP)

(72) Inventor: Kenzou Shibuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 18/221,473

(22) Filed: Jul. 13, 2023

(65) Prior Publication Data

US 2024/0017546 A1 Jan. 18, 2024

(30) Foreign Application Priority Data

Jul. 14, 2022 (JP) ................................ 2022-113292

(51) Int. Cl.
*B41J 2/045* (2006.01)

(52) U.S. Cl.
CPC ....... *B41J 2/04543* (2013.01); *B41J 2/04541* (2013.01)

(58) Field of Classification Search
CPC ................ B41J 2/04543; B41J 2/04573; B41J 2/04541; B41J 2/0451; B41J 2/0458
See application file for complete search history.

(56) References Cited

U.S. PATENT DOCUMENTS 6,616,258 B2 * 9/2003 Maeda ................. B41J 2/04543 347/12
2006/0119632 A1 * 6/2006 Ochiai ................. B41J 2/04543 347/15
2014/0139854 A1 * 5/2014 Saito .................... H04N 1/4015 358/1.9

FOREIGN PATENT DOCUMENTS

JP 2011-224874 A 11/2011

* cited by examiner

*Primary Examiner* — Thinh H Nguyen
(74) *Attorney, Agent, or Firm* — Venable LLP

(57) ABSTRACT

An apparatus drives a printhead including a plurality of print elements configured to discharge ink onto a print medium by voltage application. The apparatus includes a control unit configured to assign the plurality of print elements to a plurality of blocks, and time-divisionally drive the plurality of print elements for each block. Upon inspection of the printhead, the control unit is configured to set, for each block, an application time of a voltage applied to the print element.

14 Claims, 14 Drawing Sheets

APPARATUS AND METHOD

BACKGROUND OF THE INVENTION

Field of the Invention

The present invention relates to a driving technique of a print element that discharges ink onto a print medium by voltage application.

Description of the Related Art

In a printing apparatus that performs printing by discharging ink onto a print medium such as paper, a printhead including a plurality of print elements which discharge ink by voltage application is used. As a representative print element, an electrothermal transducer including a resistive heating element is known. This element heats ink, thereby discharging an ink droplet by the action of film boiling. There is known a technique of inspecting the printhead to set the drive condition in accordance with the individual differences of the printhead. Japanese Patent Laid-Open No. 2011-224874 discloses a technique of printing an inspection pattern while changing the voltage application time for the print elements, thereby optimizing the application time of the printhead based on the printed inspection pattern.

As the number of kinds of application times in the inspection pattern increases, the application time can be more optimized. However, if the print length of the inspection pattern increases, a longer time is required for inspection.

SUMMARY OF THE INVENTION

The present invention provides a technique of shortening the inspection time of a printhead.

According to an aspect of the present invention, there is provided an apparatus that drives a printhead including a plurality of print elements configured to discharge ink onto a print medium by voltage application, the apparatus comprising a control unit configured to assign the plurality of print elements to a plurality of blocks, and time-divisionally drive the plurality of print elements for each block, wherein, upon inspection of the printhead, the control unit is configured to set, for each block, an application time of a voltage applied to the print element.

Further features of the present invention will become apparent from the following description of exemplary embodiments (with reference to the attached drawings).

DESCRIPTION OF THE EMBODIMENTS

Figure 1:
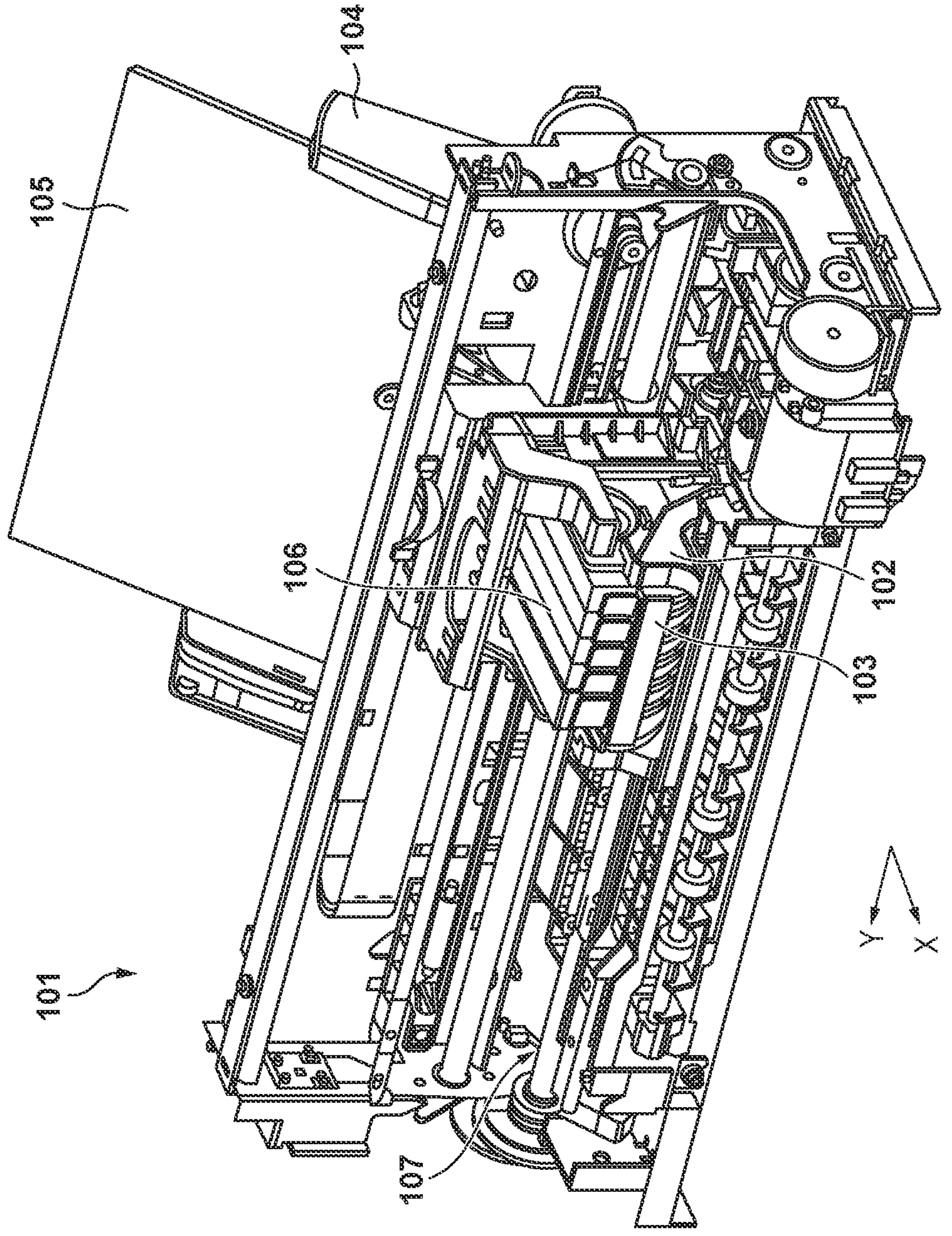
FIG. 1 is a view showing the outer appearance of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a view showing the outer appearance of a printing apparatus 101 according to an embodiment of the present invention. The printing apparatus 101 is an inkjet printing apparatus that performs printing on a print medium by discharging ink. However, the present invention can also be applied to various kinds of printing apparatuses other than the inkjet printing apparatus. In the drawings, arrows X and Y indicate horizontal directions orthogonal to each other. The Y direction is the widthwise direction of the printing apparatus 101 (the left-and-right direction). The X direction is the depth direction of the printing apparatus 101.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium", cloth, a plastic film, and the like may also be used.

The printing apparatus 101 includes a printhead 103 that can discharge ink. The printhead 103 discharges ink onto a print medium 105, thereby printing an image on the print medium 105. The printhead 103 is mounted on a carriage 102. The carriage 102 is reciprocated in the Y direction (main scanning direction) by a moving mechanism (not shown). In the process of the movement of the carriage 102, ink is discharged from the printhead 102 onto the print medium 105, thereby printing an image. This operation is called print scanning.

An ink cartridge 106, which stores ink to be supplied to the printhead 102, is also mounted on the carriage 102. The ink cartridge 106 is detachable from the carriage 102. In the printing apparatus 101 according to this embodiment, a plurality of the ink cartridges 106 are mounted on the carriage 102 so as to be independently attachable/detachable. The ink cartridges 106 store different kinds of inks. In this embodiment, four kinds of inks that include cyan, magenta, yellow, and black are used. The printing apparatus 101 can perform color printing using the plurality of kinds of inks.

The printhead 103 includes a plurality of ink discharge ports, and a plurality of print elements. The print elements are provided so as to correspond to the ink discharge ports. The printhead 103 in this embodiment employs an inkjet method in which ink is discharged using thermal energy. Therefore, an electrothermal transducer (to be sometimes called a heater) is included as the print element. By applying a pulse voltage to the corresponding heater in accordance with a print signal, ink is discharged from the corresponding ink discharge port.

A conveyance unit 107 conveys, in the X direction (sub-scanning direction), the print medium 105 fed from a feeding unit 104. The feeding unit 104 includes a tray on which print media are stacked, and a feeding mechanism for the print medium 105. The conveyance unit 107 includes a conveyance roller and a pinch roller pressed against the conveyance roller. The print medium 105 is nipped in a nip portion between the conveyance roller and the pinch roller, and conveyed in the X direction by rotation of the conveyance roller.

The conveyance unit 107 intermittently conveys the print medium 105. By alternately repeating the conveyance operation of the print medium 105 by the conveyance unit 107 and print scanning, an image for each page can be printed on the print medium 105.

Figure 2:
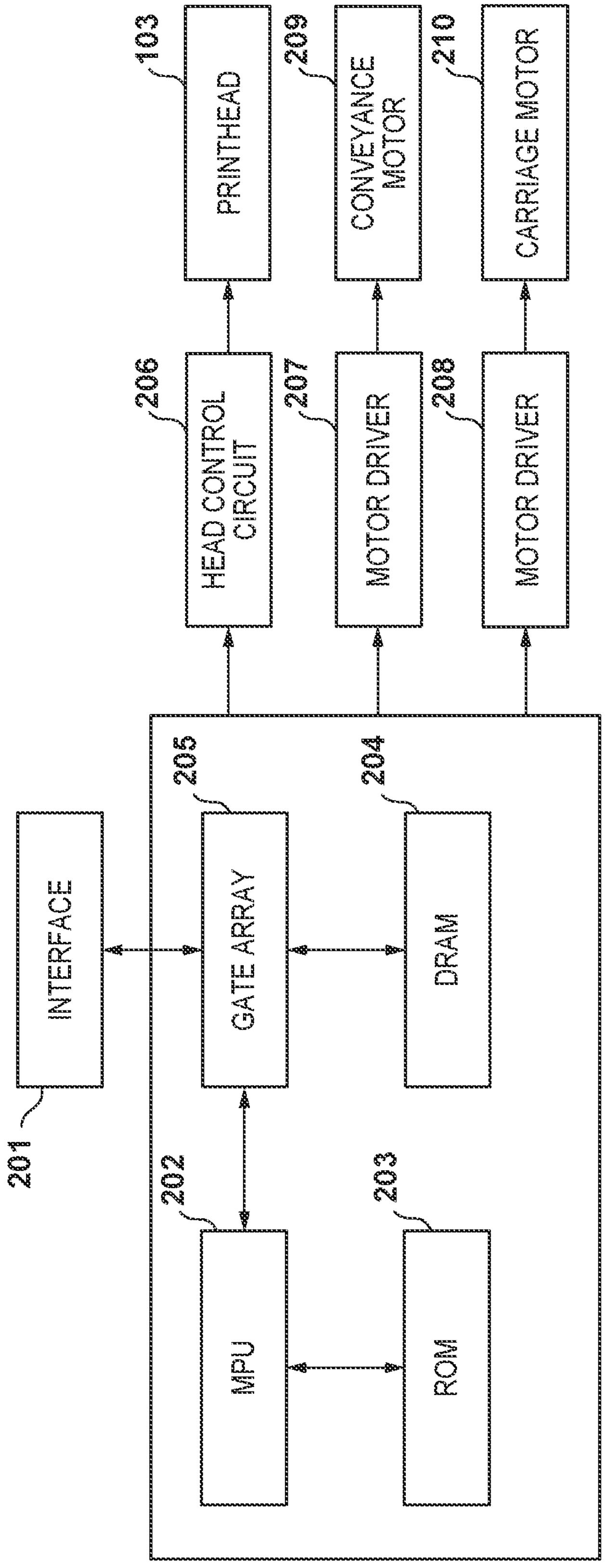
FIG. 2 is a block diagram of a control unit of the printing apparatus shown in FIG. 1.

FIG. 2 is a block diagram of a control unit of the printing apparatus 101. In FIG. 2, image data to be printed is input to an interface 201. An MPU 202 controls the entire printing apparatus 101. A control program executed by the MPU 202 is stored in a ROM 203. Various kinds of data (print data and the like) are saved in a DRAM 204.

A gate array 205 controls data supply to the printhead 103. The gate array 205 also controls data transfer between the interface 201 and the MPU 202 and the DRAM 204.

A conveyance motor 209 is a motor serving as the drive source of the conveyance unit 6, and is driven by a motor driver 207. A carriage motor 210 serves as the drive source of a mechanism that moves the carriage 102, and is driven by a motor driver 208. A head control circuit 206 drives the printhead 103.

The outline of data processing during printing will be described. When image data is input to the interface 201, the image data is converted into print data between the gate array 205 and the MPU 202. Then, the motor drivers 207 and 208 are driven, and the printhead 103 is driven in accordance with the print data transmitted to the head control circuit 206 to perform printing. A drive circuit inside the printhead 103 selectively applies a voltage to the heater in accordance with the print data, thereby generating discharge energy. The energy causes ink discharge. The printhead 103 includes the drive circuit that controls time division driving of the heaters.

Figure 3:
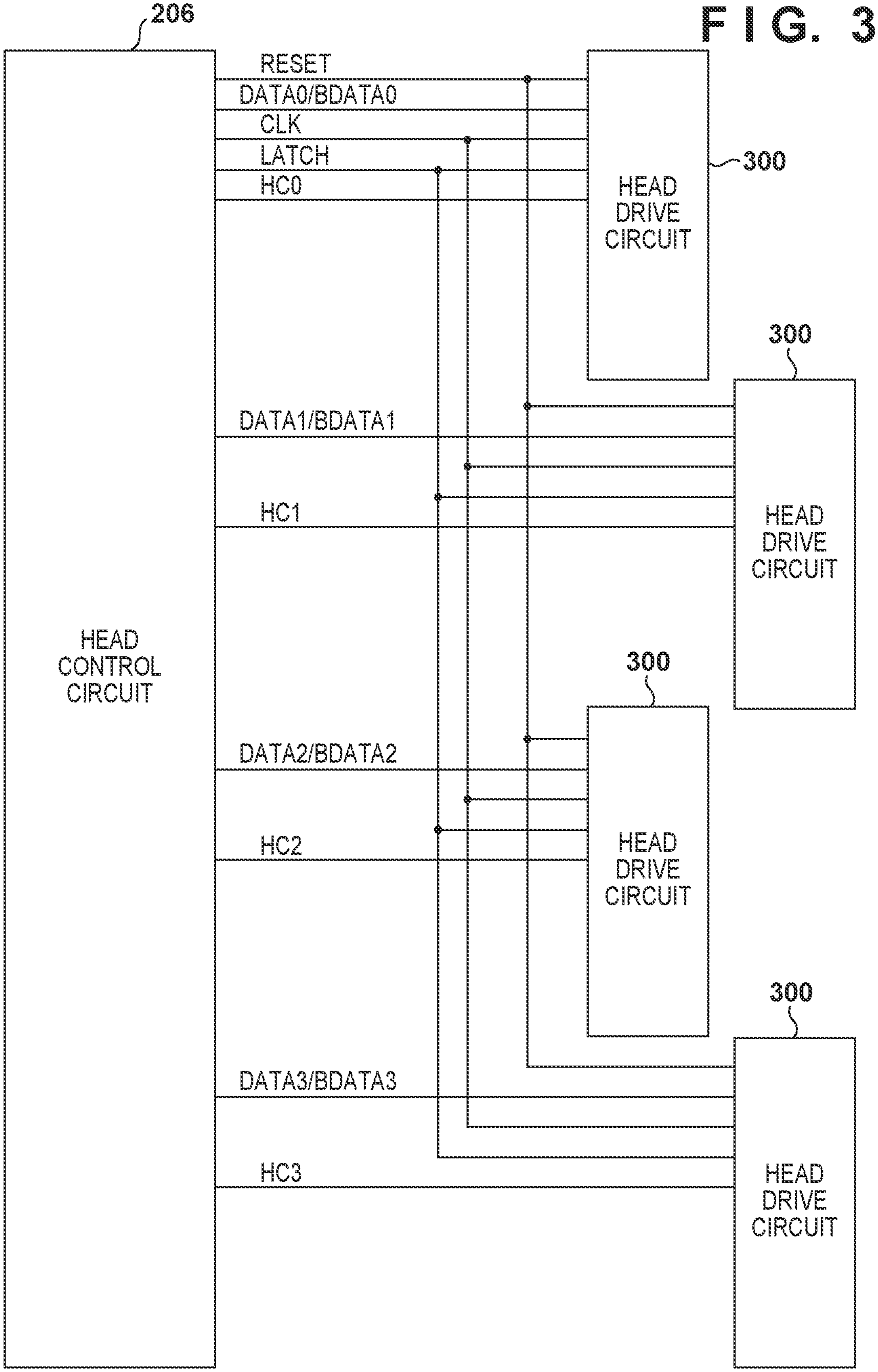
FIG. 3 is a block diagram of a circuit concerning control of a printhead.
Figure 4:
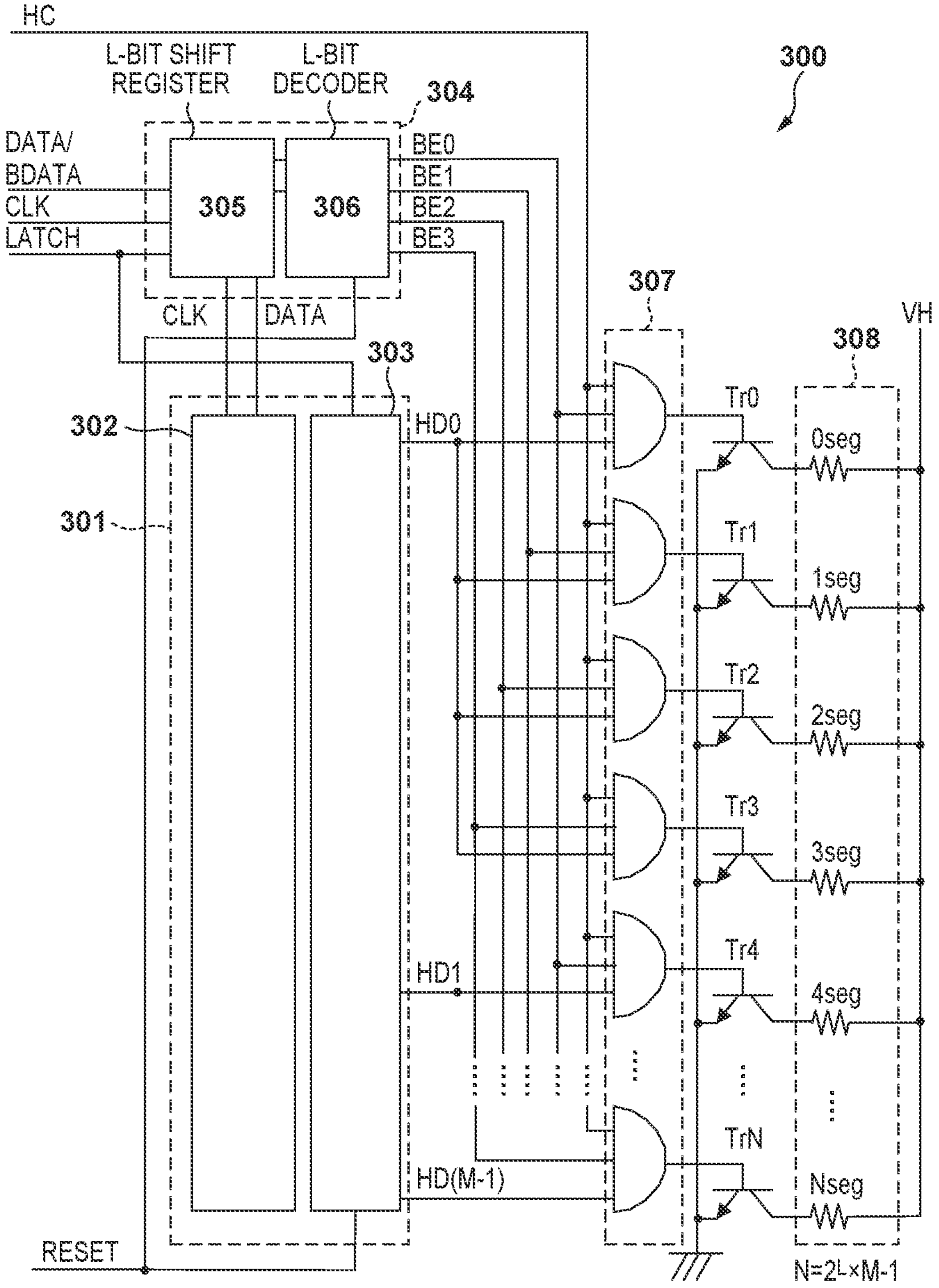
FIG. 4 is a block diagram of a head drive circuit.

FIG. 3 is a block diagram (circuit diagram) showing the head control circuit 206 and a head drive circuit 300 which is incorporated in the printhead 103. FIG. 4 is a block diagram (circuit diagram) of the head drive circuit 300. The head drive circuit 300 is provided for each kind of ink. In this embodiment, four head drive circuits 300 are provided. The head control circuit 206 is provided on the main body side of the printing apparatus 101, and controls each head drive circuit 300.

The head control circuit 206 outputs, as common signals for the head drive circuits 300, a reset (RESET) signal, a transfer clock (CLK) signal, and a latch (LATCH) signal. The head control circuit 206 also outputs, as individual signals for each head drive circuit 300, data (DATA0 to DATA3) signals, block data (BDATA0 to BDATA3) signals, and application time (HC0 to HC3) signals. The numeric values 0 to 3 appended to the symbols of the respective signals correspond to four head drive circuits 300. When the signal output destinations are not distinguished or the signals are generically referred to, the signal is denoted with the numeric value omitted. For example, HC0 to HC3 will be simply denoted as HC. The HC signal is a signal that designates the application time of the voltage applied to the heater when time division driving is performed.

The arrangement of the head drive circuit 300 will be described. First, a print data supply unit 301 will be described. The print data supply unit 301 includes an M-bit shift register 302 and a latch circuit 303. The M-bit shift register 302 stores the data (DATA) in synchronization with the CLK signal. The latch circuit 303 temporarily holds the same bit data (M-bit data) as in the M-bit shift register 302 in response to the LATCH signal.

Next, a print block selection unit 304 will be described. The print block selection unit 304 includes an L-bit shift register 305 and an L-bit decoder 306. The L-bit shift register 305 stores the block data (BDATA) in synchronization with the CLK signal. The L-bit decoder 306 temporarily holds the same bit data (L-bit data, where L=2 here) as in the L-bit shift register 305 in response to the input LATCH signal.

Note that in this embodiment, the L-bit shift register 305 for driven block designation receives the block data (BDATA) as serial data, and the L-bit decoder 306 holds the output from the L-bit shift register 305. Therefore, the driving order of the blocks during time division driving can be changed by changing the data input to the L-bit shift register 305.

A heater group 308 includes heaters 0seg to Nseg. A relationship of$N=2^L \times M-1$ holds. An AND gate group 307 is formed from N AND gates corresponding to the heaters, respectively. One of block selection signals BE0 to BE($2^L-1$) (BE3 in this embodiment) is input from the print block selection unit 304 to each AND gate in the AND gate group 307. Further, print data selection signals HD0 to HD(M−1) corresponding to print dots from the print data supply unit 301 and an HC signal are input to the respective AND gates.

An output of each AND gate turns on/off one of switching transistors Trt) to TrN corresponding to the AND gate. A voltage VH is applied to the heater 308 corresponding to the turned-on transistor of the transistors Trt) to TrN, and the heater 308 generates heat. Thus, an ink droplet is discharged.

Figure 5:
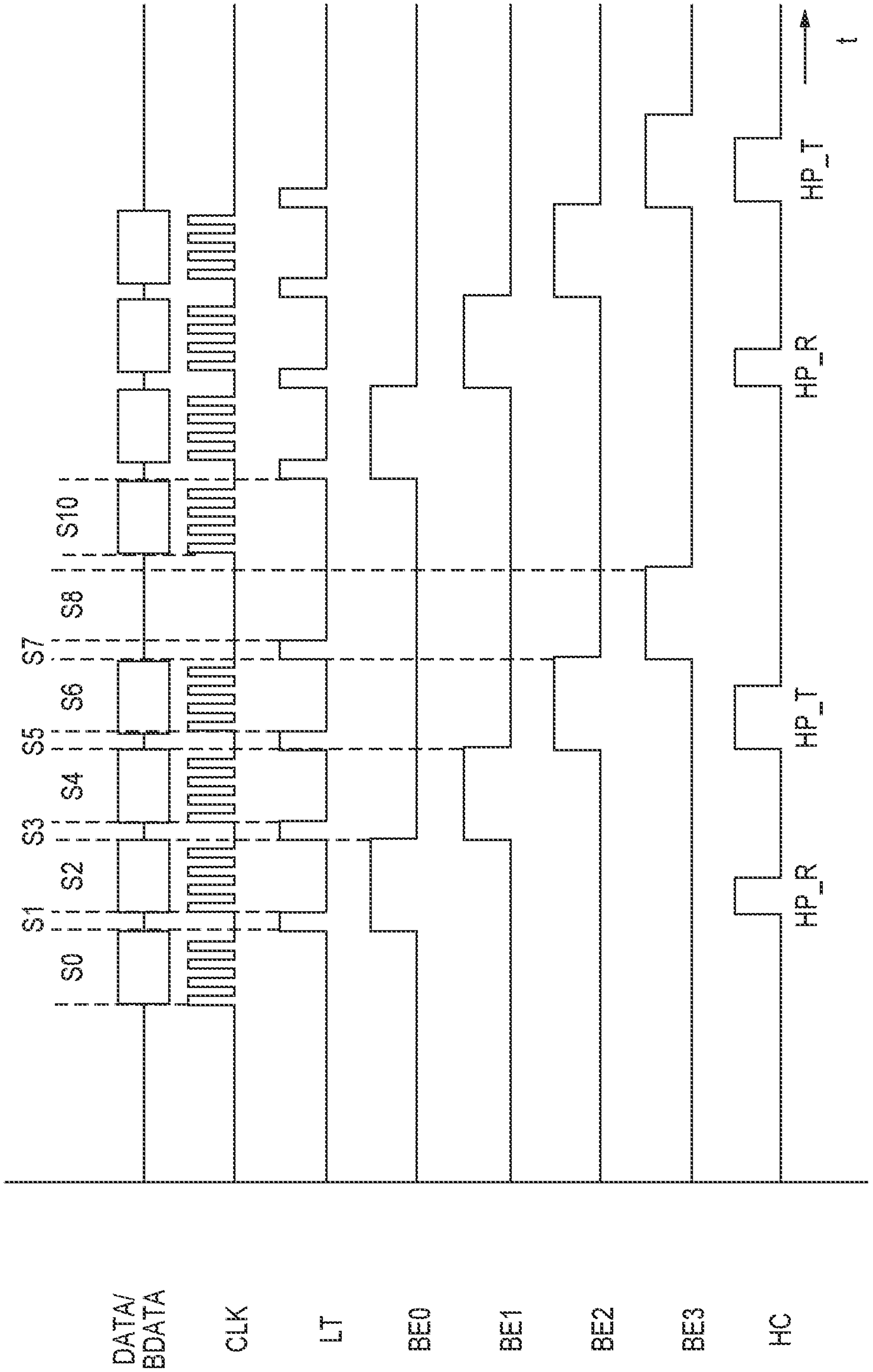
FIG. 5 is a timing chart of control signals.
Figure 6:
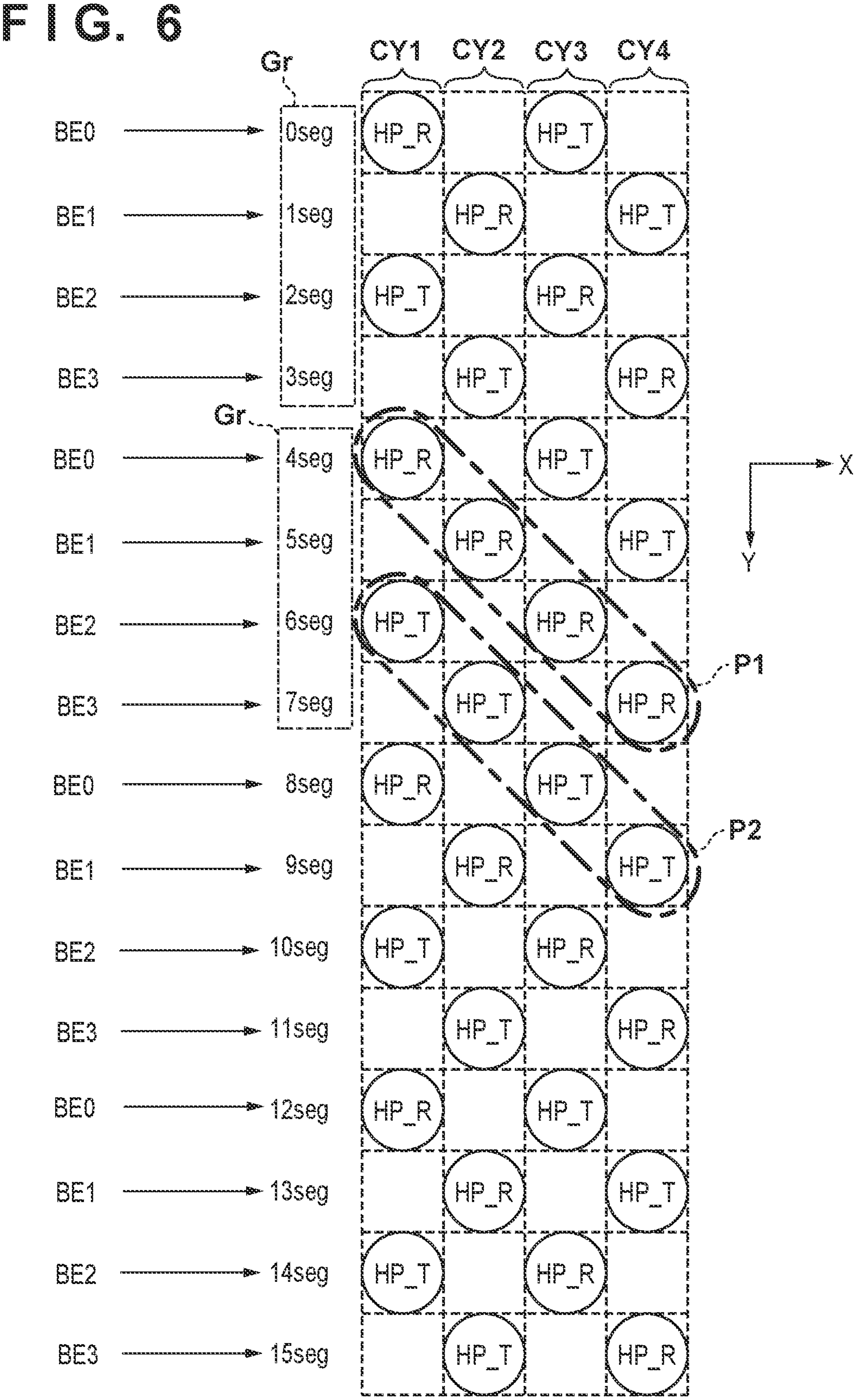
FIG. 6 is a view showing an example of the inspection pattern printed based on the control signals shown in FIG. 5.

A printing operation in inspection of the printhead 103 will be described. The inspection is performed by printing an inspection pattern on the print medium 105 for each kind of ink. FIG. 5 is a timing chart of signals related to the operation of the head drive circuit 300. FIG. 6 is a view showing an example of the inspection pattern printed on the print medium 105.

As is well known, time division driving is summarized as follows. A plurality of print elements (heaters) forming each array of ink discharge ports are divided into a plurality of groups including multiple adjacent print elements, and the multiple print elements included in each group are assigned to different blocks. For example, in the example shown in FIG. 6, the heaters 0Seg to 3Seg form one group Gr. Similarly, the heaters 4Seg to 7Seg form one group Gr. This also applies to the heaters 8Seg to Nseg. Each print element is assigned to one of four blocks BE0 to BE3. In the example shown in FIG. 6, the heaters are assigned to the blocks BE0 to BE3 in the ascending order of the number appended to Seg.

One cycle of the time division driving is defined by a section in which each of the block selection signals BE0 to BE3 is output once. In each of cycles CY1 to CY4, the print elements in one cycle are shown. In time sections S0 to S8 in FIG. 5, the timing chart of signals in the printing operation in the cycle CY1 is shown.

First, in the time section S0, the M-bit print data (DATA) and the L-bit block data (BDATA) are sequentially read in the L-bit shift register 305 and the M-bit shift register 302 in synchronization with the CLK signal.

When transfer of the print data (DATA) and the block data (BDATA) is complete, the head control circuit 206 outputs the LATCH signal at the timing of the time section S1. In response to this, the head drive circuit 300 holds the print data of the first block in the latch circuit 303, and holds the block data of the first block in the L-bit decoder 306. At this timing, the block selection signal BE0 for driving the print elements (heaters) belonging to the first block is output from the L-bit decoder 306.

After outputting the LATCH signal, in the time section S2, the head control circuit 206 starts transfer for the next driven block. With this, the M-bit print data (DATA) and the L-bit block data (BDATA) for the next driven block are sequentially read in the L-bit shift register 305 and the M-bit shift register 302 of the head drive circuit 300 in synchronization with the CLK signal.

The BE0 signal is output until the end of the time section S2. When the drive time of the first block ends, the head control circuit 206 outputs the LATCH signal in the time section S3 to switch driving to the next block. In the time section S3, at the timing of holding the block data of the block BE1 in the latch circuit 303, the BE1 signal for driving the print elements (heaters) belonging to the block BE1 is output from the L-bit decoder 306.

In this manner, until the drive time of the last block ends, transfer of the print data and block data is repeated in the time sections S4 to S8. Similarly, the block selection signal BE2 for driving the print elements belonging to the block BE2 is output from the L-bit decoder 306 at the timing of the time section S5, and the block selection signal BE3 for driving the print elements belonging to the block BE3 is output from the L-bit decoder 306 at the timing of the time section S7. In this manner, as shown in FIG. 5, time division driving of blocks is implemented in correspondence with the input of the LATCH signal.

On the other hand, the voltage application time for the print element can be changed within one cycle (one column) by the head control circuit 206 changing the length of the HC signal for each block. In the example shown in FIG. 5, the HC signal having a pulse width HP_R and the HC signal having a pulse width HP_T are used. In the example shown in FIG. 5, for example, the pulse width HP_R is the reference time, and the pulse width HP_T is the measurement target time (inspection target time).

In the time sections S1 to S8 shown in FIG. 5, the HC signal having the pulse width HP_R is output in synchronization with the BE0 signal, and the HC signal having the pulse width HP_T is output in synchronization with the BE2 signal. The HC signal is not output in synchronization with the BE1 signal and the BE3 signal. In this case, as illustrated in printing in the cycle CY1 in FIG. 6, ink droplets corresponding to the pulse width HP_R are discharged by the heaters 0seg, 4Seg, 8Seg, and the like belonging to the block BE0, thereby forming dots. Further, ink droplets corresponding to the pulse width HP_T are discharged by the heaters 2seg, 6Seg, 10Seg, and the like belonging to the block BE2, thereby forming dots. The dots discharged by voltage application of the pulse width HP_R serving as the reference and the dots discharged by voltage application of the pulse width HP_T serving as the measurement target are formed close to each other on the print medium 105. The inspector can visually check the densities of these dots to determine the appropriateness of the voltage application time.

In the example shown in FIG. 5, in the time sections S0 to S8, the pulse width of the HC signal is set as; the pulse width HP_R in the block BE0, no signal in the block BE1, the pulse width HP_T in the block BE2, and no signal in the block BE3. In the subsequent printing (the time section S10 and subsequent time sections), the voltage application time of the HC signal for each block is cyclically shifted among the blocks in a predetermined order in every cycle. FIG. 6 shows print results for four cycles.

In the cycle CY2, the pulse width of the HC signal is set as: no signal in the block BE0, the pulse width HP_R in the block BE1, no signal in the block BE2, and the pulse width HP_T in the block BE3. The dot discharged by voltage application of the pulse width HP_R and the dot discharged by voltage application of the pulse width HP_T are shifted from those in the cycle CY1, respectively, by one pixel in the Y direction. In the cycle CY3, the pulse width of the HC signal is set as: the pulse width HP_T in the block BE0, no signal in the block BE1, the pulse width HP_R in the block BE2, and no signal in the block BE3. The dot discharged by voltage application of the pulse width HP_R and the dot discharged by voltage application of the pulse width HP_T are shifted from those in the cycle CY2, respectively, by one pixel in the Y direction.

In the cycle CY4, the pulse width of the HC signal is set as: no signal in the block BE0, the pulse width HP_T in the block BE1, no signal in the block BE2, and the pulse width HP_R in the block BE3. The dot discharged by voltage application of the pulse width HP_R and the dot discharged by voltage application of the pulse width HP_T are shifted from those in the cycle CY3, respectively, by one pixel in the Y direction. With this, the voltage application time of the HC signal goes around by the blocks BE0 to BE3.

In the printed inspection pattern, the dots discharged by voltage application of the pulse width HP_R are arranged on a line as indicated by a line P1. Further, the dots discharged by voltage application of the pulse width HP_T are arranged on a line as indicated by a line P2. Since the line P1 and the line P2 are printed in parallel and there is a region between them where no ink has been discharged, the inspector can easily compare the density difference between the dot discharged by voltage application of the pulse width HP_R and the dot discharged by voltage application of the pulse width HP_T. Accordingly, the inspector can visually and more easily determine the appropriateness of the voltage application time for the heater.

Figure 15:
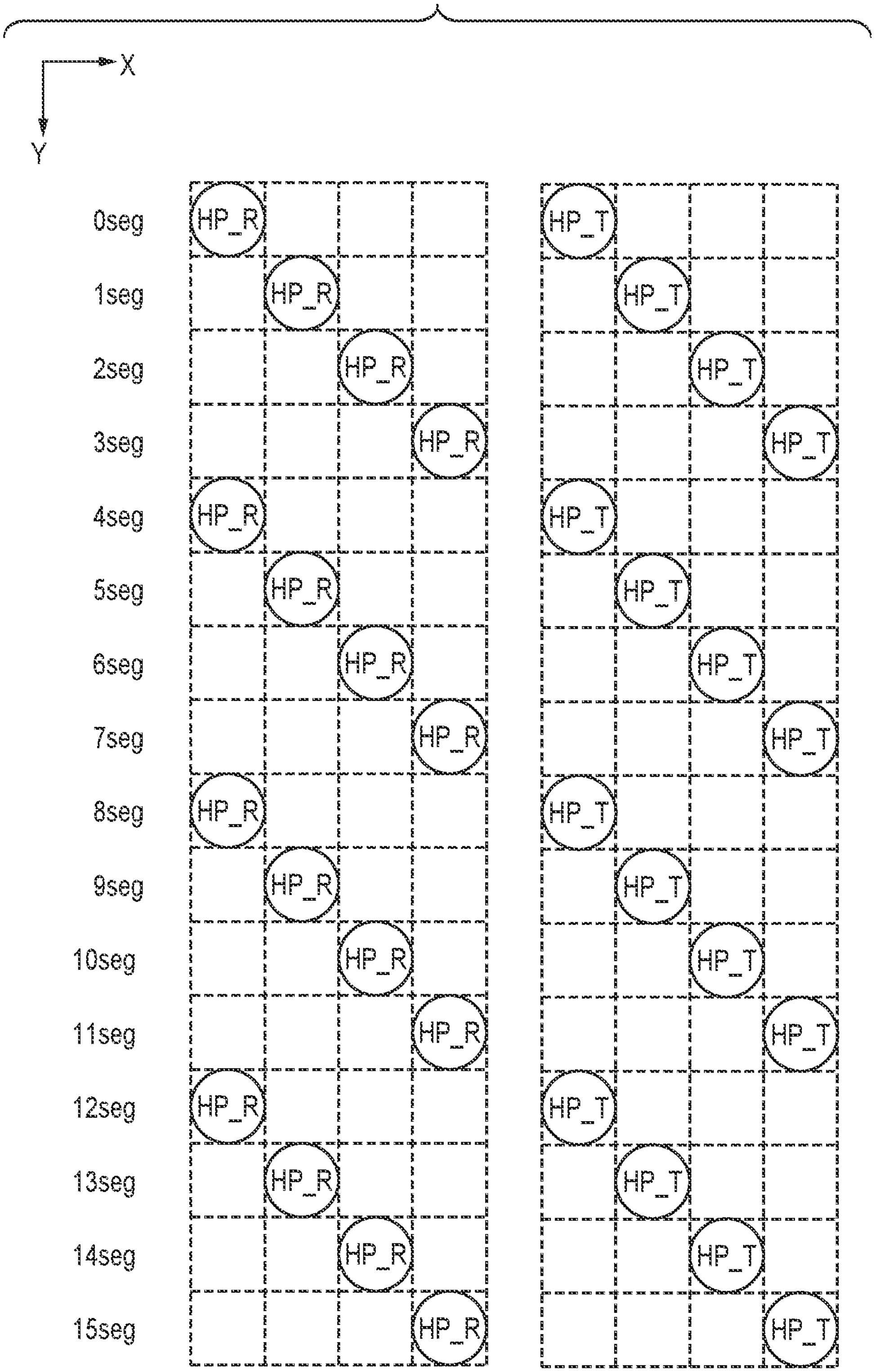
FIG. 15 is a view showing an example of the inspection pattern formed using a single application time.

In this embodiment, since the length of the HC signal is set for each block, the printed area of the inspection pattern can be reduced. Accordingly, the inspection time of the printhead 103 can be shortened. FIG. 15 shows, as a comparative example, an example in which the length of the HC signal is common among all blocks. In the example shown in FIG. 15, in order to print an inspection pattern similar to the inspection pattern in the example shown in FIG. 6, printing is performed for four cycles using the HC signal having the pulse width HP_R, and further performed for four cycles using the HC signal having the pulse width HP_T. In the example shown in FIG. 15, the printed area is twice that in the example shown in FIG. 6, so that a longer print time is required. That is, in the example shown in FIG. 6, the inspection pattern can be printed in the print time half that in the example shown in FIG. 15, so that the inspection time can be shortened. In addition, in the example shown in FIG. 6, the dots discharged by voltage applications of different pulse widths are printed at closer positions than in the example shown in FIG. 15, so that the inspector can easily compare the dots.

Second Embodiment

Figure 7:
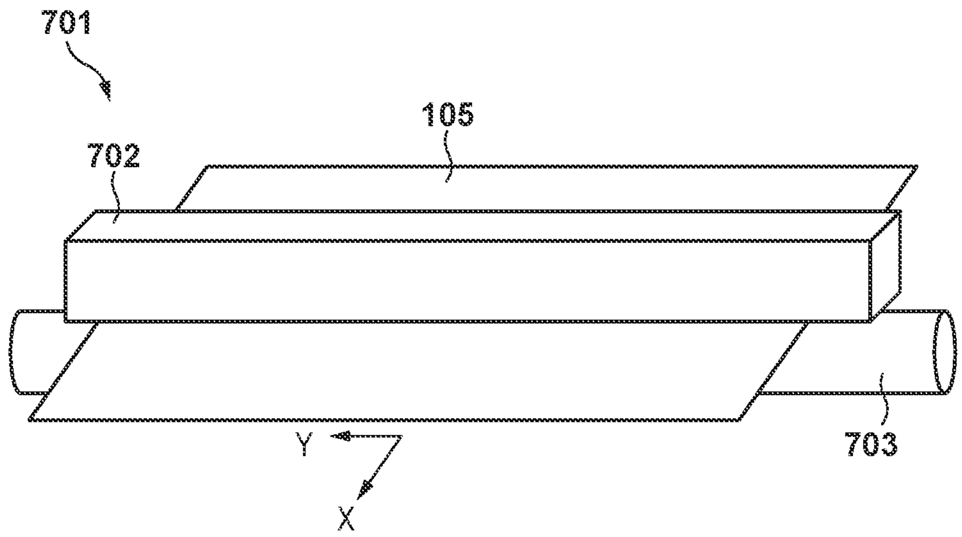
FIG. 7 is a schematic view showing an example of a full-line head.

In the first embodiment, the serial type inkjet printing apparatus 101, in which the printhead 103 is mounted on the carriage 102 and moved in the Y direction, has been exemplified. However, the contents described in the first embodiment are also applicable to a printing apparatus including a full-line head. FIG. 7 is a schematic view of a printing apparatus 701 according to the second embodiment. A conveyance unit 703 includes a conveyance roller, and conveys a print medium 105 in the X direction. A printhead 702 is arranged such that the print element array has the Y direction length corresponding to the width of the print medium 105. The position of the printhead 702 is fixed.

Also in the printhead 702 which is the full-line head as described above, it is possible to print the inspection pattern shown in FIG. 6 on the print medium 105 by setting the length of an HC signal for each block as in the first embodiment.

Third Embodiment

Figure 8:
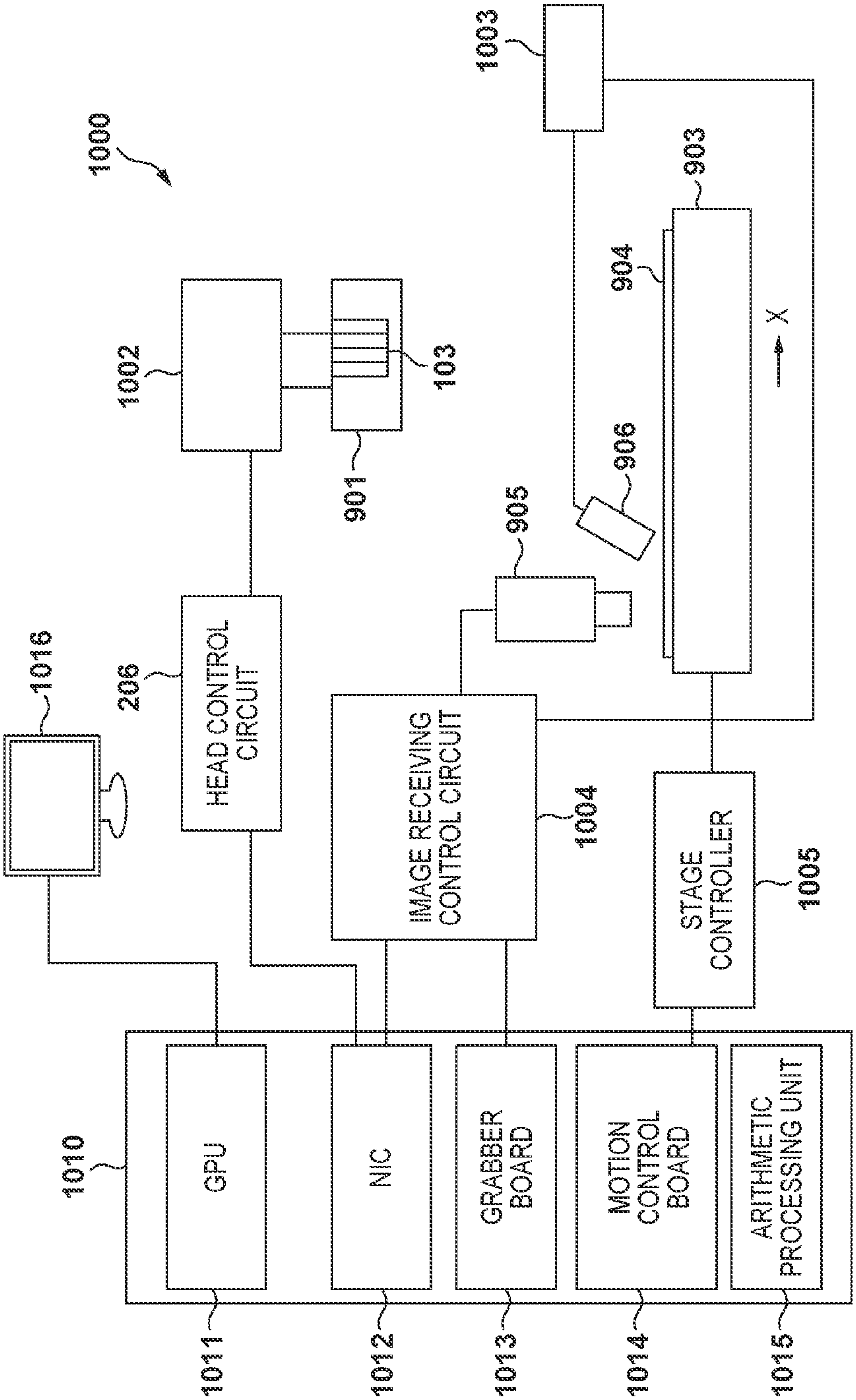
FIG. 8 is a block diagram of an inspection apparatus according to another embodiment of the present invention.

FIG. 8 is a block diagram of a measurement apparatus 1000 according to an embodiment of the present invention. The measurement apparatus 1000 is an apparatus specialized for inspection of the printhead 103 according to the first embodiment. The measurement apparatus 1000 is used, for example, before shipment of the product of the printhead 103. Note that the measurement apparatus 1000 may be an apparatus used for inspection of the printhead 702 as the full-line head described in the second embodiment. The measurement apparatus 1000 includes a carriage 901 to which the printhead 103 is fixed. An ink cartridge (not shown) is also mounted on the carriage 901.

For measurement, the printhead 103 is caused to discharge droplets onto a print medium 904 on a stage 903, thereby printing an inspection pattern. The inspection pattern is captured by a camera 905. Arithmetic processing is performed on the captured image data, and the application time of the voltage to be applied to the print element is set.

An illumination apparatus 906 is arranged near the camera 905. The illumination apparatus 906 uses an LED illumination that can output wavelengths of R: 625 [nm], G: 528 [nm], and B: 470 [nm], and also ensure durability and light amount stability.

The plurality of head drive circuits 300 described in the first embodiment are mounted on the printhead 103. A head control circuit 206 is electrically connected to the head drive circuits 300 via a contact probe unit 1002. An illumination power source 1003 is a power source of the illumination apparatus 906. The illumination apparatus 906 includes an external control terminal, and can control the light amount of each of R, G, and B of the illumination apparatus 906 under the control of an image receiving control circuit 1004.

The print medium 904 is placed on the stage 903. The print medium 904 is in tight contact with the surface of the stage 903 by vacuum suction or the like. The stage 903 is displaced by a mechanism (not shown), thereby forming a conveyance mechanism that conveys the print medium 904. The position of the stage 903 is detected by an encoder sensor. The position of the stage 903 is controlled by a stage controller 1005 such that the inspection pattern formed from droplets discharged from the printhead 103 onto the print medium 904 enters the angle of view of the camera 905. Coating has been performed on the surface of the print medium 904 so that droplets can be uniformly absorbed when they are fixed.

The camera 905 includes an image capturing sensor that captures the inspection pattern formed from droplets discharged from the printhead 103 and reads the image. The image capturing sensor is, for example, a line sensor type CCD camera. A merit of using the line sensor type CCD camera is that the camera is relatively inexpensive but has a high resolution, and only a necessary portion of the inspection pattern can be received as an image. With this, image data with a low capacity can be obtained from a high-resolution image, and processing speed can be improved. The image data obtained by the camera 905 is transmitted to a grabber board 1013 via the image receiving control circuit 1004.

A control computer 1010 includes a Graphics Processing Unit (GPU hereinafter) 1011 for display output, and a video signal is output to a monitor 1016 via the GPU 1011. The control computer 1010 also includes a Network Interface Card (NIC hereinafter) 1012, the grabber board 1013, and a motion control board 1014, and can collectively perform each control. The control computer 1010 can receive image data from the grabber board 1013, and perform arithmetic processing at a high speed using an arithmetic processing unit 1015.

Figure 9:
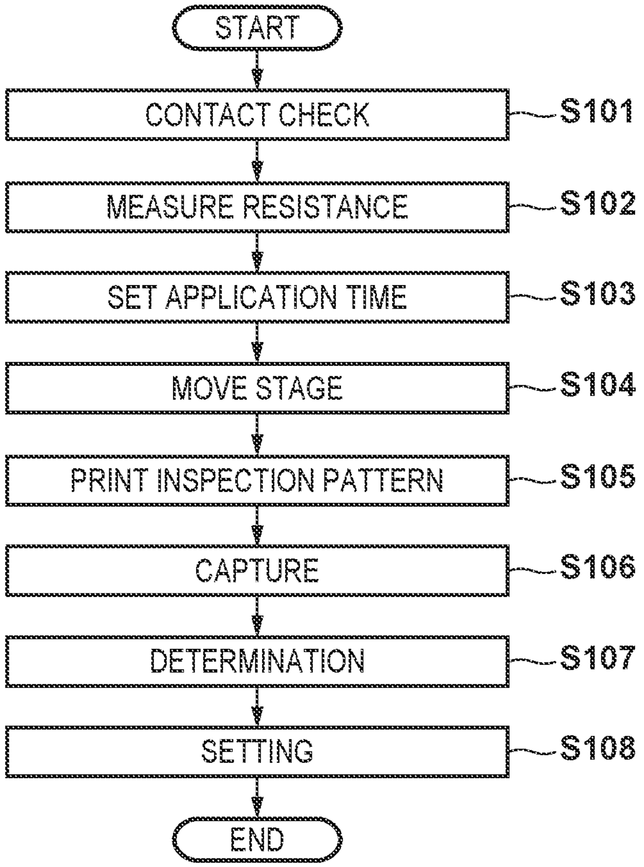
FIG. 9 is a flowchart illustrating an example of an inspection process.

Next, the procedure of inspection of the printhead 103 in this embodiment will be described in detail. FIG. 9 is a flowchart illustrating an example of a process executed by the computer 1010.

Figure 10:
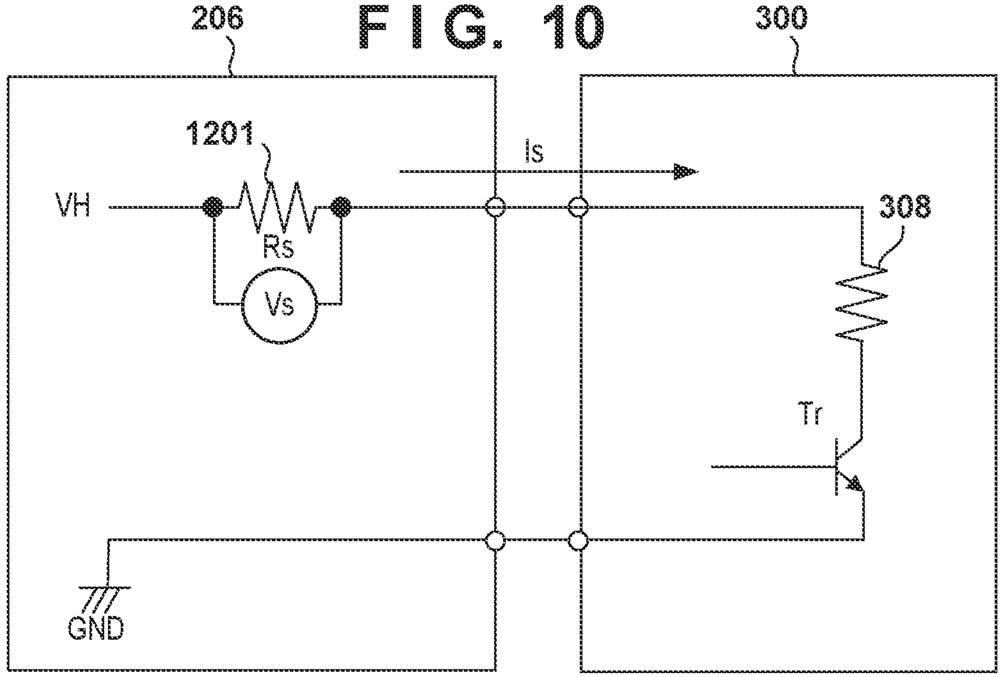
FIG. 10 is a circuit diagram of a resistance inspection circuit.

First, contact check is performed to check the electrical connection between the head drive circuits 300 mounted on the printhead 103 and the head control circuit 206 (step S101). Then, before printing the inspection pattern, the electric resistance value of the print element (heater) is measured (step S102). The head control circuit 206 in this embodiment includes a circuit that measures the electric resistance value of the heater. FIG. 10 is a circuit diagram showing an example. The electric circuit shown in FIG. 10 measures the electric resistance value of the heater 308 of the printhead 103. For example, a pulse of 5.0 μs with a drive voltage of 5.0 V is applied to the heater 308. A potential difference Vs across a shunt resistor Rs 1201 is measured by a voltage sensor Vs to calculate Is flowing the electric circuit. The electric resistance value of the heater 308 is calculated by:

$$\text{resistance value}=(5.0-Vs)/Is$$

Referring back to FIG. 9, setting (discharge setting) regarding the length (application time) of the HC signal applied to the heater 308 to discharge an ink droplet is performed (step S103). In step S103, a tentative application time (pulse width) of the voltage applied to the heater 308 is set. The application time is set based on the electric resistance value of the heater 308 measured in step S102. The ink droplet discharge energy of the heater 308 is decided from the voltage value of a drive voltage VH applied to the heater 308 and the application time of the drive voltage VH. In this embodiment, the voltage value of the drive voltage VH is fixed, and the application time (the length of the HC signal) is variable. More specifically, the voltage value is set to 24 V, and the tentative pulse width of the HC signal is set in accordance with the electric resistance value (average resistance value) of the heater 308. With this, the tentative discharge energy for causing the printhead 103 to discharge an ink droplet is decided.

Then, in order to form the inspection pattern on the print medium 904, the stage 903 is moved (step S104). The moving speed of the stage 903 is decided based on the ink discharge characteristics of the printhead 103. For example, the stage 903 is moved at 25 inches/sec.

Then, the inspection pattern is printed by discharging ink from the printhead 103 onto the print medium 904. Conveyance of the print medium 904 and movement of the printhead 103 during printing of the inspection pattern are basically as in the first embodiment. For ink discharge control, the tentative length of the HC signal set in step S103 is used. The inspection pattern having different densities is printed on the print medium 904.

When inspecting the discharge energy, it will take a lot of time to measure all discharge energies in the energy setting range assumed from variations in the manufacturing process of the heater 308. By setting the length of the HC signal from the electric resistance value of the heater 308 measured in step S102, the range of discharge energy as the measurement target can be limited.

Figure 11:
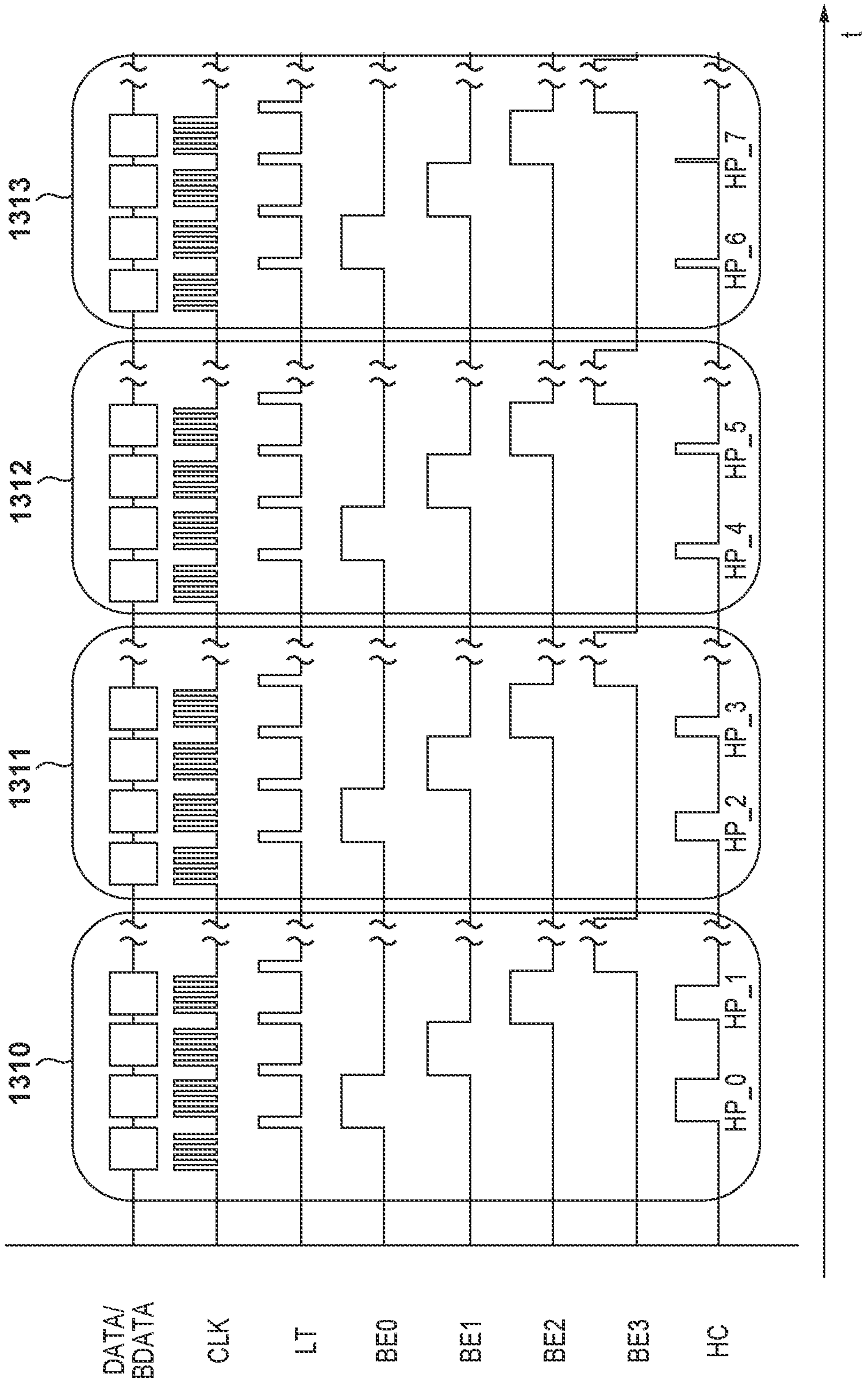
FIG. 11 is a timing chart of control signals.
Figure 12:
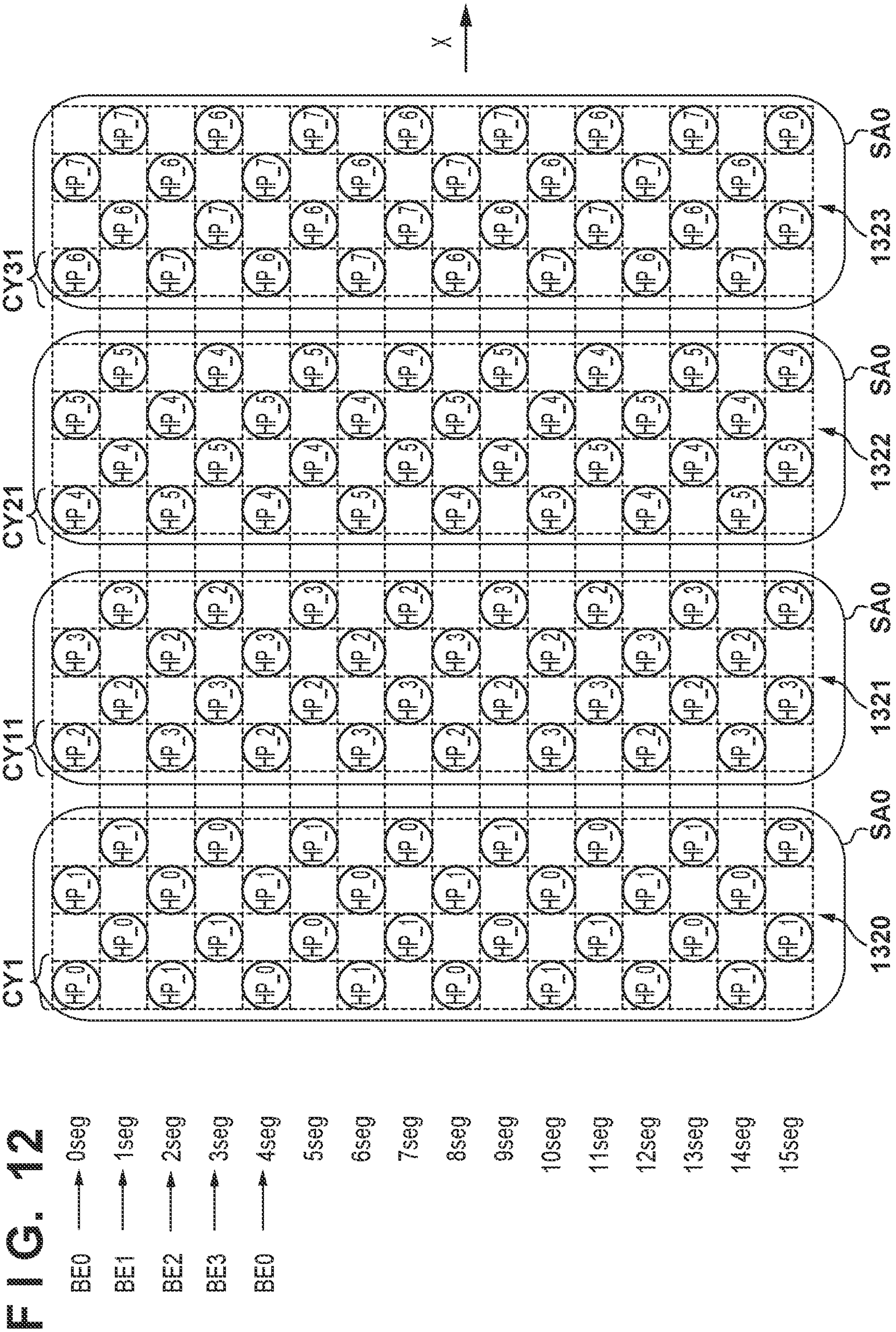
FIG. 12 is a view showing an example of the inspection pattern printed based on the control signals shown in FIG. 11.

FIG. 11 is a timing chart of signals upon printing the inspection pattern, and FIG. 12 shows an example of the inspection pattern printing by the signals shown in FIG. 11. A pattern 1320 in FIG. 12 is printed by a signal group 1310 in FIG. 11. Similarly, patterns 1321, 1322, and 1323 in FIG. 12 are printed by signal groups 1311, 1312, and 1313 in FIG. 11, respectively. Each of the signal groups 1310 to 1313 is formed from signal arrays for four cycles of time division driving. Each of the patterns 1320 to 1323 is the print result for four cycles of time division driving. Each of the signal groups 1310, 1311, 1312, and 1313 partially shown in FIG. 11 mainly shows signals in the first cycle (CY1, CY11, CY21, or CY31) of time division driving.

Each of the patterns 1320 to 1323 is printed in which droplets discharged from respective ink discharge ports and fixed on the print medium 904 do not overlap each other and each droplet forms one dot.

In the signal group 1310 that prints the pattern 1320, two kinds of pulse widths including a pulse width HP_0 and a pulse width HP_1 are set as the lengths (application times) of the HC signal. The pulse width HP_0 is set as the tentative length of the HC signal in step S103. The pulse width HP_1 is set by reducing the pulse width HP_0 by a predetermined time (0.02 μs here).

In the signal group 1311 that prints the pattern 1321, two kinds of pulse widths including a pulse width HP_2 and a pulse width HP_3 are set as the lengths (application times) of the HC signal. The pulse width HP_2 is set by reducing the pulse width HP_1 by 0.02 μs, and the pulse width HP_3 is set by reducing the pulse width HP_2 by 0.02 μs.

In the signal group 1312 that prints the pattern 1322, two kinds of pulse widths including a pulse width HP_4 and a pulse width HP_5 are set as the lengths (application times) of the HC signal. The pulse width HP_4 is set by reducing the pulse width HP_3 by 0.02 μs, and the pulse width HP_5 is set by reducing the pulse width HP_4 by 0.02 μs.

In the signal group 1313 that prints the pattern 1323, two kinds of pulse widths including a pulse width HP_6 and a pulse width HP_7 are set as the lengths (application times) of the HC signal. The pulse width HP_6 is set by reducing the pulse width HP_5 by 0.02 μs, and the pulse width HP_7 is set by reducing the pulse width HP_6 by 0.02 μs.

The method described above is repeated to print many patterns while setting the pulse widths of the HC signal for each pattern. In the example shown in FIGS. 10 and 11, the four patterns 1320 to 1323 form the inspection pattern, but five or more patterns (as an example, nine patterns) may form the inspection pattern.

As in the first embodiment, in four cycles of time division driving, the block applied with each pulse width of the HC signal is cyclically shifted. As a result, as shown in FIG. 12, for example, in the pattern 1320, the dots discharged by voltage application of the pulse width HP_0 are arranged on a line, and the dots discharged by voltage application of the pulse width HP_1 are arranged on a line parallel thereto.

Referring back to FIG. 9, when printing of the inspection pattern ends, stage movement is performed by moving the stage 903 with the print medium 904 placed thereon to the measurement area of the camera 905, and the inspection pattern is captured by the camera 905 (step S106). The captured inspection pattern is received in the control computer 1010 as one image.

Then, the pattern within an allowable range is determined from the captured image of the inspection pattern (step S107). For example, the fixing ratio of the ink droplets is calculated, and the determination can be made based on the calculation result. The fixing ratio can be defined by an area SA0 of the print region of the pattern and the fixing area of ink droplets for each pulse width. The area SA0 is a predetermined known value. In the determination in step S107, the total area of the dots of the ink droplets for each pulse width is obtained by image processing as the fixing area. For example, the fixing ratio of the ink droplets discharged by voltage application of the pulse width HP_0 is calculated by fixing ratio=(total area of dots of ink droplets discharged by voltage application of pulse width HP_0)/area SA0. Similarly, the fixing ratio is also calculated for each of other pulse widths HP_1 to HP_7.

In the example shown in FIGS. 11 and 12, the relationship of the pulse width HP_0>HP_1 . . . >HP_7 holds. Accordingly, the fixing ratio of the droplets with the pulse width HP_0 in the pattern 1320 is highest, and this corresponds to the strongest discharge energy. Since the value of the discharge energy is proportional to the voltage application time for the heater 308, the ink density decreases as the pulse width decreases. The pattern width with winch the density falls within an allowable range, that is, with which the fixing ratio falls within a predetermined allowable range can be set as the pulse width to be used in printing after the inspection. Note that the allowable range may be changed in accordance with the use condition of the printhead 103.

As the allowable range, the minimum value of the fixing ratio may be, for example, 1.0%. For example, if the fixing ratio with the pulse width HP_6 is smaller than the allowable minimum value, the pulse width HP_5, which corresponds to the stronger discharge energy than the pulse width HP_6, may be set as the pulse width to be used in printing after the inspection.

In step S108, in accordance with the determination result in step S107, the voltage application time (the pulse width of the HC signal) for the print element is set. The setting may be performed by writing the information of the application time in a ROM (not shown) mounted in the printhead 103.

In addition to the application time, the ID, date of manufacture, and the like of the printhead 103 can also be written in the ROM.

In this embodiment, inspection of the printhead 103 can be automated. In addition, by setting the voltage application time for the print element with the fixing ratio as a reference, it is possible to perform the inspection in a relatively short time.

Fourth Embodiment

In the embodiments described above, in one cycle of time division driving, two kinds of the voltage application times (the pulse widths HP of the HC signal) for the print element are used. However, three or more kinds of application times may be used in one cycle of time division driving. The number of kinds may be changed in accordance with the pattern.

Here, an inspection method considering manufacturing variations (individual differences) of a printhead 103 will be exemplarily shown. Examples of manufacturing variations here are variations in the resistance value that changes in accordance with the material, line width, and length of the wiring of the circuit included in the printhead 103. The manufacturing variations influence the variation in discharge energy.

Figure 13:
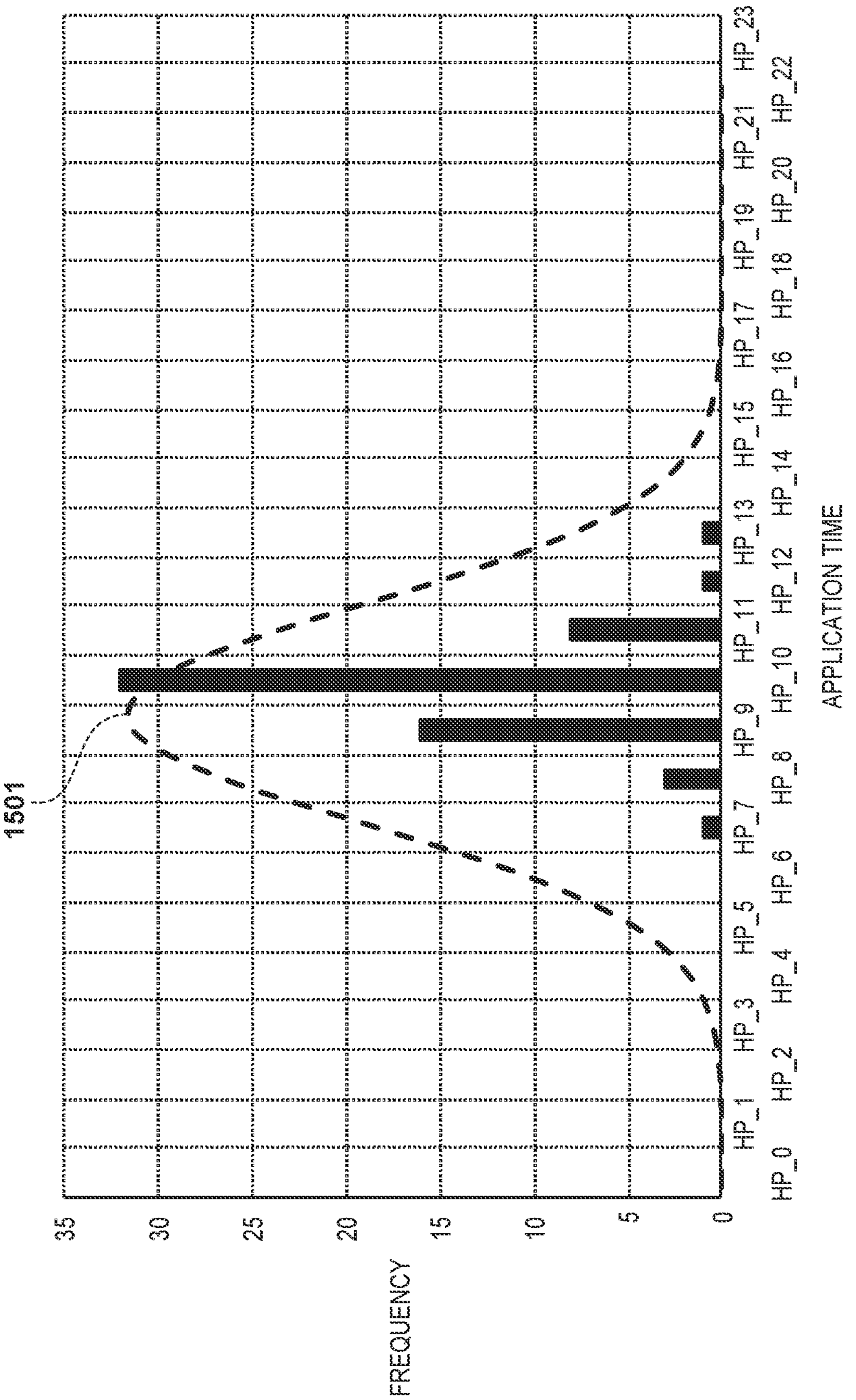
FIG. 13 is a graph showing the normal distribution of the optimized application time.

It is empirically known that even if the manufacturing variations exist, the optimal value of the voltage application time for the print element falls within a certain range. FIG. 13 illustrates the normal distribution showing an example. The abscissa represents the kind of a pulse width HP, and 24 kinds of the pulse widths obtained by sequentially reducing the pulse width from HP_0 by 0.02 us as exemplarily shown in the third embodiment are shown. The ordinate represents the frequency of determination as the optimal pulse width in past inspections. The example shown in FIG. 13 shows that the optimal value is likely to exist within the range of pulse widths HP_8 to HP_11.

Therefore, in the time region of the application time which is not likely to correspond to the optimal discharge energy (for example, the range of the pulse widths HP_0 to HP_7 or the range of the pulse widths HP_12 to HP_23 in FIG. 13), the number of kinds of application times in one cycle of time division driving may be increased.

Figure 14:
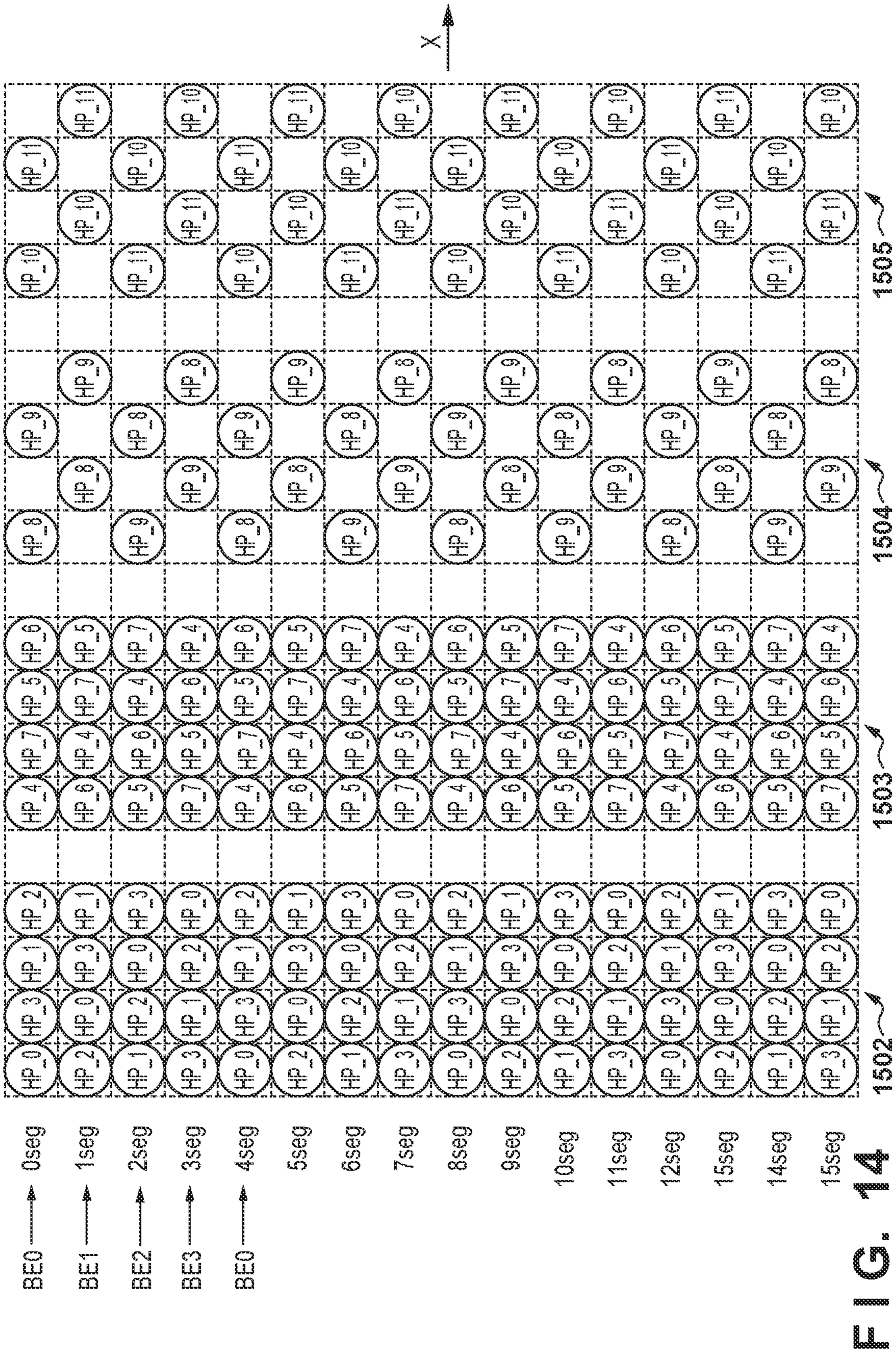
FIG. 14 is a view showing an example of the inspection pattern based on the normal distribution shown in FIG. 13.

FIG. 14 is a view showing the inspection pattern as an example. In the example shown in FIG. 14, in the time region of the application time which is unlikely to correspond to the optimal discharge energy, the number of kinds of the application times in one cycle of time division driving is relatively increased. To the contrary, in the time region of the application time which is likely to correspond to the optimal discharge energy, the number of kinds of the application times in one cycle of time division driving is relatively decreased, thereby improving pattern recognition rate.

More specifically, since the pulse widths HP_0 to HP_6 are unlikely to correspond to the optimal discharge energy, four kinds of application times are set in one cycle of time division driving. For example, in a pattern 1502, the pulse widths HP_0 to HP_3 are set in one cycle of time division driving. In four cycles of time division driving, one of the pulse widths HP_0 to HP_3 is cyclically set in each of four blocks BE0 to BE3.

Similarly, in a pattern 1503, the pulse widths HP_4 to HP_7 are set in one cycle of time division driving. In four cycles of time division driving, one of the pulse widths HP_4 to HP_7 is cyclically set in each of the four blocks BE0 to BE3. Although not shown, this also applies to the pulse widths HP_12 to HP_23 which are unlikely to correspond to the optimal discharge energy.

On the other hand, since the pulse widths HP_7 to HP_11 are likely to correspond to the optimal discharge energy, two kinds of application times are set in one cycle of time division driving. For example, in a pattern 1504, the pulse width HP_8 and the pulse width HP_9 are set in one cycle of time division driving. In four cycles of time division driving, one of the pulse width HP_8, no signal, the pulse width HP_9, and no signal is cyclically set in each of the four blocks BE0 to BE3.

Similarly, in a pattern 1505, the pulse width HP_10 and the pulse width HP_11 are set in one cycle of time division driving. In four cycles of time division driving, one of the pulse width HP_10, no signal, the pulse width HP_11, and no signal is cyclically set in each of the four blocks BE0 to BE3.

According to this embodiment, it is possible to form a discharge energy inspection pattern in which weighting according to the likelihood to correspond to the optimal discharge energy has been performed. Hence, it is possible to improve the inspection accuracy and shorten the inspection time.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-113292, filed Jul. 14, 2022, which is hereby incorporated by reference herein in its entirety.

What is claimed is:

1. An apparatus that drives a printhead including a plurality of print elements configured to discharge ink onto a print medium by voltage application, the apparatus comprising:

a control unit configured to assign the plurality of print elements to a plurality of blocks, and time-divisionally drive the plurality of print elements for each block, wherein, for inspection of the printhead, the control unit is configured to set, for each block, an application time of a voltage to be applied to the print elements, and for inspection of the printhead, the control unit is configured to:

set, for a first time region of the application time, a number of kinds of the application times for each block in one cycle of the time division driving to a first number of kinds, and set, for a second time region of the application time, the number of kinds of the application times for each block in one cycle of the time division driving to a second number of kinds different from the first number of kinds.

2. The apparatus according to claim 1, wherein for inspection of the printhead, the control unit is configured to cyclically shift the application time for each block among the plurality of blocks in a predetermined order.

3. The apparatus according to claim 2, wherein for inspection of the printhead, the control unit is configured to;

set, as the application time, a first application time for one block among the plurality of blocks, and set, as the application time, a second application time different from the first application time for one of other blocks.

4. The apparatus according to claim 2, wherein for inspection of the printhead, the control unit is configured to:

set, as the application time, a first application time for a first block among the plurality of blocks, not set the application time for a second block following the first block in the order such that no ink is discharged, and set, as the application time, a second application time different from the first application time for a block following the second block in the order.

5. The apparatus according to claim 1, wherein for inspection of the printhead, the control unit is configured to cyclically shift the application time for each block among the plurality of blocks in a predetermined order in every cycle of the time division driving.

6. The apparatus according to claim 5, wherein for inspection of the printhead, the control unit is configured to;

set, as the application time, a first application time for one block among the plurality of blocks, and set, as the application time, a second application time different from the first application time for one of other blocks.

7. The apparatus according to claim 5, wherein for inspection of the printhead, the control unit is configured to:

set, as the application time, a first application time for a first block among the plurality of blocks, not set the application time for a second block following the first block in the order such that no ink is discharged, and set, as the application time, a second application time different from the first application time for a block following the second block in the order.

8. The apparatus according to claim 1, further comprising:

an image capturing unit configured to capture an image printed on the print medium by ink discharged from the plurality of print elements for inspection of the printhead; and a setting unit configured to set, based on the image captured by the image capturing unit, the application time to be applied after inspection.

9. The apparatus according to claim 8, further comprising:

a calculation unit configured to calculate a ratio of a predetermined area and an ink fixing area from the captured image, wherein the setting unit is configured to set, based on a calculation result of the calculation unit, the application time to be applied after inspection.

10. The apparatus according to claim 1, wherein the apparatus is a printing apparatus comprising a carriage configured to move the printhead mounted on the carriage.

11. The apparatus according to claim 1, wherein the apparatus is a printing apparatus comprising a full-line head as the printhead.

12. The apparatus according to claim 1, wherein the apparatus is an inspection apparatus configured to inspect the printhead.

13. The apparatus according to claim 1, further comprising:

a conveyance unit configured to convey the print medium.

14. A method of driving a printhead including a plurality of print elements configured to discharge ink onto a print medium by voltage application, the method comprising:

conveying the print medium; and controlling so as to assign the plurality of print elements to a plurality of blocks, and time-divisionally drive the plurality of print elements for each block, wherein in the controlling, for inspection of the printhead, an application time of a voltage applied to the print elements is set for each block, and in the controlling, for inspection of the printhead, for a first time region of the application time, a number of kinds of the application times for each block in one cycle of the time division driving is set to a first number of kinds, and, for a second time region of the application time, the number of kinds of the application times for each block in one cycle of the time division driving is set to a second number of kinds different from the first number of kinds.

* * * * *